June 2, 1959 R. H. THOMAS 2,889,078
DISPENSING CONTAINER FOR PRESSURE-PROPELLED PRODUCTS
Filed Dec. 16, 1955
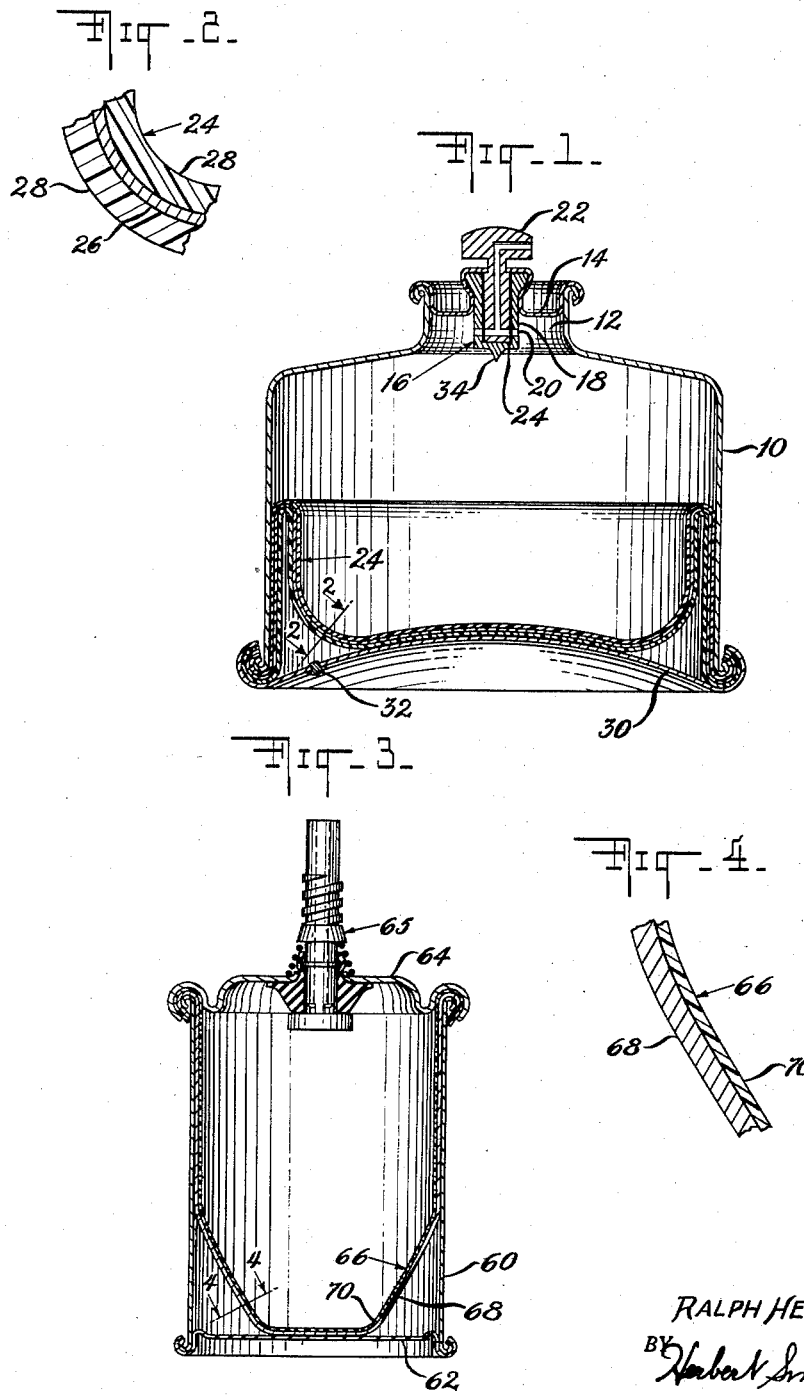
INVENTOR.
RALPH HENRY THOMAS
BY
ATTORNEY

# United States Patent Office 2,889,078
Patented June 2, 1959

2,889,078

DISPENSING CONTAINER FOR PRESSURE-PROPELLED PRODUCTS

Ralph Henry Thomas, Rahway, N.J., assignor to Colgate-Palmolive Company, Jersey City, N.J., a corporation of Delaware Application December 16, 1955, Serial No. 553,564

8 Claims. (Cl. 222—95)

The present invention relates to dispensing containers for pressure-propelled products. More particularly it relates to such containers which employ an easily liquefied normally gaseous substance as the propellant and in which said propellant is separated from the product to be dispensed by means of a flexible barrier.

It has previously been proposed to employ flexible barriers, e.g. diaphragms, sacks and the like, to isolate the product from the Freon or other propellant used in "aerosol" dispensers. Metal foil, rubber, fabrics or synthetic films have previously been proposed as suitable substances for use as barriers, however none of these have been fully satisfactory. Flexible metal foils are non-permeable, if perfect, but generally contain pinholes through which propellant can pass. Metal foils are also likely to be subjected to corrosion by the product to be dispensed. On the other hand, resilient materials such as polymeric films, although they may be corrosion resistant, are also subject to pinholing and in addition, are generally permeable to the low molecular weight gases used as propellants.

It has now been found possible to construct dispensing containers (for pressure propelled products) having a non-resilient barrier that has improved imperviousness to propellant and which is highly flexible and corrosion resistant. In accordance with the present invention a dispensing container for pressure-propelled product comprises an outer casing having a discharge outlet, a valve closing said discharge outlet, and a flexible pressure deformable plastic coated metallic foil sealed to said casing and forming therewith two mutually exclusive chambers, one of which communicates with said valve and the other of which is sealed, said plastic coated metallic foil being adapted to transmit pressure from the said sealed chamber to said valved chamber and to deform so as to shrink the volume of said valved chamber as its contents are dispensed.

The instant dispensing containers, by virtue of their effective separation of propellant and product, are suitable for dispensing a wide variety of substances such as those intended for application to the body or for internal use, e.g. toothpaste, mouth wash, toilet articles and cosmetics, drugs, foods and edible products.

It is preferred to construct the instant barriers of laminated metallic foil and plastic film. More particularly it is preferred to employ laminated aluminum foil and polymerized ethylene glycol-terephthalic acid plastic (Mylar) film or sheet material, as films of this plastic are characterized by physical and chemical properties making it especially desirable for this application, e.g. strength, flexibility, freedom from pinholing and chemical inertness. The easily deformable aluminum foil employed is in a soft, annealed state, and may suitably be laminated with the plastic film using an adhesive and pressure rolling at elevated temperatures. Preferably each layer of the laminate (which may contain two, three or more layers) is from 0.0002 to 0.005 inch thick. The layers employed are sufficient in number and thickness so that the total laminate thickness is from about .001 to about .006 inch, in order to insure imperviousness and adequate flexibility. Laminates prepared according to the preferred embodiment are free of pinholes, exhibit very high bursting strength and resistance to pinholing and fracturing due to flexing, are not permeable to gases, are light in weight, and are highly resistant to corrosion. Normally where the plastic film is laminated to only one side of the metal foil, it is preferred to employ the laminated barrier with the metal foil exposed to the propellant and the plastic exposed to the product to be dispensed.

In order to more fully illustrate the present invention reference is made to the accompanying drawings in which:

Fig. 1 is a sectional view of a dispenser having a three ply laminate sealed to base of the casing and carrying a prick for puncturing the laminate when fully extended upwardly.

Fig. 2 is a detailed section of the laminate of Fig. 1, being taken along line 2—2 thereof, Fig. 3 is a sectional view of a dispensing container having a two ply laminate crimped between the casing and the top of the dispenser, and Fig. 4 is a detailed section of the laminate of Fig. 3, being taken along a line 4—4 thereof.

The dispenser shown in section in Figure 1 includes a rigid vertical cylindrical casing or can 10 having a discharge opening 12 at the top thereof. This opening is closed by a cap 14 carrying a plug valve 16 comprising a stationary body 18 having lateral perforations 20 and a rotatable hollow plug 22 also carrying lateral perforations 24. By rotation of the plug, the perforations therein can be placed in register or alignment with the openings in the stationary body thus opening the valve. The valve is closed by turning the plug until the perforations are out of register.

A laminated diaphragm 24 (shown in detail in Fig. 2) made of aluminum foil 26 approximately .0005 inch thick laminated on each side with a Mylar (ethylene glycol-terephthalic acid polymer) film 28 0.0015 inch thick is crimped at its periphery between the base of the outer casing and a concave bottom 30. The bottom is provided with an opening providing access to the propellant chamber. After the propellant has been charged to the container through this opening, it is sealed by a plug 32. The diaphragm 24 is of such proportions that it extends across the full cross section of the casing and has, when fully upwardly expanded or unfolded, substantially the same shape or contour and size as the interior of the outer casing. A prick 34 may be mounted on the underside of the valve 16 so as to puncture the diaphragm when it is fully extended and thereby release the propellant from the otherwise empty container, rendering it innocuous on incineration or the like.

In use, diaphragm material is placed over the lower end of the casing and is conformed, under pneumatic pressure, to the interior casing, a suitable plug having been temporarily placed in the cap opening 12. The temporary plug is then removed and the laminate is crimped between the casing and the bottom. Product is then charged to the product chamber through the opening at the top of the container. The valve cap, to which has previously been assembled a suitable valve, is then sealed over this opening, and the container is inverted and charged with propellant through the filling hole in the bottom. This hole is spot soldered or otherwise plugged after filling.

The dispenser shown in section in Fig. 3 includes an open ended vertical cylindrical casing 60, closed at its lower end by a bottom member 62 and at its upper end by a top member 64. The top member carries a valve 65. The bottom and top members are crimped to the casing.

A sheet 66 of aluminum foil 68 .001 inch thick and laminated on its upper side with a film of Mylar (ethylene glycol-terephthalic acid polymer) 70, .0005 inch thick, is peripherally sealed by crimping between the upper part of the case and the top member, forming a bag or sack closed at its upper end by the valve and the top member. As shown in detail in Fig. 4, the aluminum foil 68 faces the bottom of the container (so as to contact propellant) and the plastic film 70 faces upwards (so as to contact product).

In use, the laminate bag is placed over the upper end of the cylinder and then is loaded with product. The bag may be suitably supported from below during filling. The top member, on which has previously been mounted a suitable valve, is then crimped over the laminate and the upper edge of the casing, and any excess laminate is trimmed away from the outside of the crimp. The container is inverted, charged with propellant, and the bottom is then crimped on.

Although the present invention has been described with reference to a preferred embodiment thereof, it will be apparent to those skilled in the art that variations and modifications of this invention can be made without departing from the principles and true spirit of the invention. Thus, the instant laminates may be replaced by metal foils which have been plastic coated by deposition from a solvent or by thermal fusion of powdered plastic on the surface of the foil, instead of by adhesion or fusion thereto of a discrete film of plastic. Also the preferred aluminum foil may be replaced by other metals such as copper, brass, lead and tin, and the preferred ethylene glycol-terephthalic acid polymer film may be replaced by other plastics such as polyethylene and its halogenated analogues, polyvinyl chloride, polyvinylidene chloride, and chlorinated rubber. However, the preferred laminates of aluminum foil and Mylar film are superior to and not equivalent of such substitutes.

I claim:

1. A dispensing container for pressure propelled products comprising a hollow cylindrical outer casing having top and bottom members joined thereto, a discharge opening on said top member, a valve sealing said opening, and a flexible, pressure deformable laminate of aluminum foil and polymerized ethylene glycol-terephthalic acid plastic film, said laminate being peripherally sealed to the upper edge of said cylindrical casing and forming a valved chamber with said top member and valve and a sealed chamber with said cylindrical casing and bottom member.

2. A dispensing container for pressure propelled products comprising a hollow cylindrical outer casing having top and bottom members joined thereto, a discharge opening on said top member, a valve sealing said opening, and a flexible, pressure deformable laminate of aluminum foil and polymerized ethylene glycol-terephthalic acid plastic film, said laminate being peripherally sealed to the lower edge of said cylindrical casing and forming a valved chamber with said top member, cylindrical casing and valve, and a sealed chamber with said bottom member.

3. A dispensing container for pressure propelled products comprising an outer casing having a discharge outlet, a valve closing said discharge outlet, a flexible, pressure deformable plastic coated metallic foil sealed to said casing and forming therewith two mutually exclusive chambers, one of which communicates with said valve and the other which is sealed, said plastic coated metallic foil being adapted to transmit pressure from said sealed chamber to said valved chamber and to deform so as to shrink the volume of said valved chamber as its contents are dispensed, and means for puncturing said diaphragm when said valve chamber is substantially empty.

4. A dispensing container for pressure propelled products comprising an outer casing having a discharge outlet at the top thereof and a bottom thereon, a valve closing said discharge outlet, a flexible, pressure deformable plastic-to-metal laminate sealed to said casing below the top thereof and forming with said casing and valve a valved chamber for retaining product to be dispensed therefrom and forming with said bottom a closed chamber for retaining pressure generating means therein, said laminate being adapted to assume a collapsible state when said product chamber is fully loaded and to displace said product and assume substantially completely the shape of the interior surface of said casing when said valve is opened while said diaphragm is subjected to pressure, and a prick mounted on said valve and adapted to puncture said laminate when said laminate has displaced said product and assumed substantially completely the shape of the interior surface of said casing.

5. A dispensing container for pressure propelled products as set forth in claim 1 wherein each layer of said laminate is from 0.0002 to 0.005 inch thick and the total laminate thickness is from about 0.001 to about 0.006 inch.

6. A dispensing container for pressure-propelled products as set forth in claim 5 wherein said laminate has an exposed plastic side and an exposed aluminum foil side, the plastic side of said laminate facing said valved chamber and the aluminum side of said laminate facing said sealed chamber.

7. A dispensing container adapted to contain product to be dispensed and a self-contained normally gaseous propellant, said dispenser being suitable for long storage and use without contact of such product by such gaseous propellant, comprising a rigid outer casing, a recessed bottom member sealed to said casing and adapted to permit said casing to stand upright on a flat, horizontal surface, a top closure on said casing, an outlet in said top closure for discharge of material to be dispensed from said container, a valve closing said discharge outlet, and a plastic coated metallic foil non-resilient diaphragm sealed to said casing and forming an upper chamber which communicates with said valve and is adapted to contain a product to be dispensed through said valve and forming with said bottom member a sealed lower chamber adapted to contain a gaseous propellant, said metallic foil rendering said diaphragm impervious to gaseous propellant, said diaphragm being adapted to transmit pressure from propellant in said sealed chamber to product in said upper chamber and to deform to shrink the volume of said upper chamber as said product is dispensed through said valve, while preventing contact of said product and propellant gas during storage and use.

8. A dispensing container wherein a self-contained gaseous propellant is isolated during long storage and use from contact with product to be dispensed, comprising a rigid outer casing, a recessed bottom member sealed to said casing and adapted to permit said casing to stand upright on a flat, horizontal surface, a top closure on said casing, an outlet in said top closure for discharge of material to be dispensed from said container, a valve closing said discharge outlet, a plastic coated metallic foil non-resilient diaphragm sealed to said casing and forming an upper chamber communicating with said valve, said upper chamber containing a product to be dispensed through said valve, and said diaphragm forming with said bottom member a sealed lower chamber containing gaseous propellant, said metallic foil rendering said diaphragm impervious to said gaseous propellant, said diaphragm transmitting the pressure of said gaseous propellant from said sealed lower chamber to said product in said upper chamber and deforming so as to shrink the volume of said valved chamber as said product is dispensed through said valve, while preventing contact of said product with said propellant gas during storage and use.

References Cited in the file of this patent

UNITED STATES PATENTS 1,743,056     Whitaker               Jan. 7, 1930

(Other references on following page)

UNITED STATES PATENTS

| | | | |
|---|---|---|---|
| 1,831,751 | Rado | Nov. 10, | 1931 |
| 2,038,760 | Roselle | Apr. 28, | 1936 |
| 2,513,455 | Cornelius | July 4, | 1950 |
| 2,662,034 | Mason et al. | Dec. 8, | 1953 |
| 2,683,100 | Edgar et al. | July 6, | 1954 |
| 2,702,580 | Bateman | Feb. 22, | 1955 |
| 2,714,569 | Prindle et al. | Aug. 2, | 1955 |
| 2,740,732 | Peck et al. | Apr. 3, | 1956 |
| 2,744,662 | Smith et al. | May 8, | 1956 |
| 2,779,066 | Gaugher et al. | Jan. 29, | 1957 |